United States Patent
Tsujimoto et al.

(10) Patent No.: US 8,854,448 B2
(45) Date of Patent: Oct. 7, 2014

(54) IMAGE PROCESSING APPARATUS, IMAGE DISPLAY SYSTEM, AND IMAGE PROCESSING METHOD AND PROGRAM

(71) Applicant: Canon Kabushiki Kaisha, Tokyo (JP)

(72) Inventors: Takuya Tsujimoto, Kawasaki (JP); Takao Tani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/909,847

(22) Filed: Jun. 4, 2013

(65) Prior Publication Data

US 2013/0271593 A1    Oct. 17, 2013

Related U.S. Application Data

(63) Continuation of application No. PCT/JP2012/083830, filed on Dec. 27, 2012.

(30) Foreign Application Priority Data

Dec. 27, 2011 (JP) .................. 2011-286785
Dec. 26, 2012 (JP) .................. 2012-282781

(51) Int. Cl.

| H04N 9/47 | (2006.01) |
|---|---|
| H04N 7/18 | (2006.01) |
| G06T 3/00 | (2006.01) |
| G09G 5/02 | (2006.01) |
| G02B 21/36 | (2006.01) |
| H04N 5/341 | (2011.01) |
| H04N 5/232 | (2006.01) |

(52) U.S. Cl.
CPC .. G09G 5/02 (2013.01); H04N 7/18 (2013.01); G06T 3/00 (2013.01); H04N 5/3415 (2013.01); H04N 5/23238 (2013.01); G02B 21/36 (2013.01)
USPC .......................................... 348/79

(58) Field of Classification Search
CPC ....... G02B 21/365; G02B 21/367; H04N 7/18
USPC ................................ 348/79, 36–39
See application file for complete search history.

(56) References Cited

U.S. PATENT DOCUMENTS

| 2004/0252875 A1* | 12/2004 | Crandall et al. ............ 382/133 |
|---|---|---|
| 2009/0006969 A1* | 1/2009 | Gahm et al. ................. 715/732 |
| 2011/0116694 A1* | 5/2011 | Gareau ....................... 382/128 |

FOREIGN PATENT DOCUMENTS

| JP | 2000258252 A | 9/2000 |
|---|---|---|
| JP | 2007121837 A | 5/2007 |

(Continued)

*Primary Examiner* — Andy Rao
*Assistant Examiner* — Jared Walker
(74) *Attorney, Agent, or Firm* — Canon USA, Inc. IP Division

(57) ABSTRACT

There is provided an image processing apparatus which can prevent the case where it is difficult to perform highly accurate diagnosis using combined boundary regions in a combined image.

An image processing apparatus includes image data acquisition means, combined-image data generation means, and combined-boundary-region display data generation means. The image data acquisition means acquires multiple pieces of divided image data obtained by capturing images of multiple regions into which a captured area for an imaging target is divided. The combined-image data generation means generates combined-image data on the basis of the multiple divided image data. The combined-boundary-region display data generation means generates display image data to be used for an observer to recognize combined boundary regions in the combined-image data. The combined-boundary-region display data generation means changes at least one of a color and a brightness for all of the combined boundary regions included in a display area.

15 Claims, 15 Drawing Sheets

(56) References Cited

FOREIGN PATENT DOCUMENTS

| | | |
|---|---|---|
| JP | 2008-295820 A | 12/2008 |
| JP | 2009141630 A | 6/2009 |
| JP | 2010061129 A | 3/2010 |
| JP | 2010134374 A | 6/2010 |

* cited by examiner

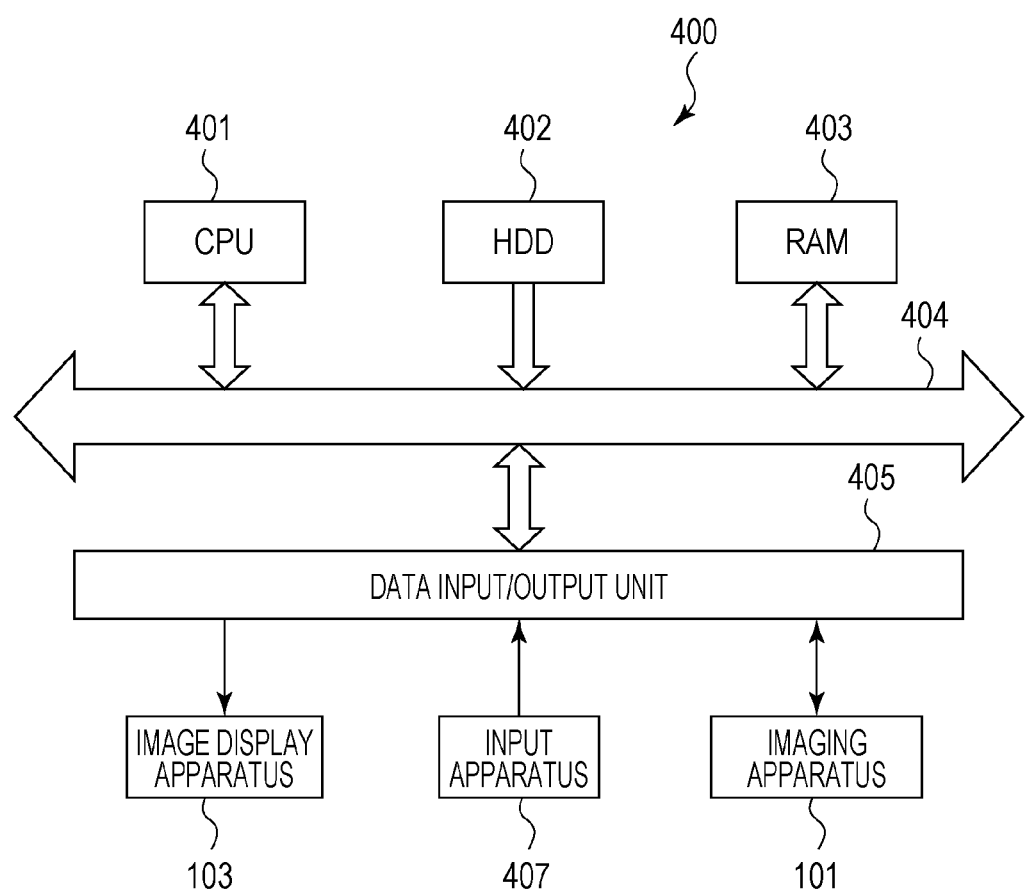

⦿ CONNECTING-REGION DISPLAY ON
◯ CONNECTING-REGION DISPLAY OFF

○ COLOR
○ LINE WIDTH
○ LINE TYPE

IMAGE PROCESSING APPARATUS, IMAGE DISPLAY SYSTEM, AND IMAGE PROCESSING METHOD AND PROGRAM

CROSS-REFERENCE TO RELATED APPLICATIONS

This application is a Continuation of International Patent Application No. PCT/JP2012/083830, filed Dec. 27, 2012, which claims the benefit of Japanese Patent Application No. 2011-286785, filed Dec. 27, 2011 and No. 2012-282781, filed Dec. 26, 2012, all of which are hereby incorporated by reference herein in their entirety.

TECHNICAL FIELD

The present invention relates to image processing apparatuses, and particularly, to digital image processing for observing an imaging target.

BACKGROUND ART

Recently, in the field of pathology, attention has been focused on virtual slide systems that serve as a substitute for an optical microscope which is a tool for pathological diagnosis and that enable pathological diagnosis to be performed on a display by photographing a sample to be examined (imaging target) which is mounted on a preparation and by digitizing images. By digitizing pathological diagnosis images by using a virtual slide system, optical microscope images of a sample to be examined in the related art can be handled as digital data. As a result, advantages, such as faster telediagnosis, the usage of digital images as an explanatory aid for patients, sharing of rare cases, and more efficient education and training, are expected to be achieved.

To achieve operations using a virtual slide system which are approximately equivalent to those using an optical microscope, it is necessary to digitize the entire sample to be examined which is on a preparation. By digitizing the sample to be examined, digital data generated using a virtual slide system can be observed using viewer software which operates on a personal computer (PC) or a workstation. The number of pixels for the entire digitized sample to be examined is typically several hundreds of millions to several billions, which is a very large amount of data.

The amount of data generated using a virtual slide system is enormous, and various observations can be performed from micro-observation (enlarged detail image) to macro-observation (bird's-eye view of the whole) by using a viewer to perform an enlargement/reduction process, and the system is thus convenient in various different ways. By obtaining all pieces of necessary information in advance, instant display of a low-magnification image to a high-magnification image can be performed using a resolution and a magnification which are desired by a user. In addition, obtained digital data is subjected to image analysis, and, for example, determination of the shape of a cell, calculation of the number of cells, and calculation of the nucleus to cytoplasm area ratio (N/C ratio) are performed. Accordingly, various types of information useful in pathological diagnosis can be also presented.

As such a technique of obtaining a high-magnification image of an imaging target, a method has been proposed in which high-magnification images obtained by photographing portions of an imaging target are used to obtain a high-magnification image of the entire imaging target. Specifically, in PTL 1, a microscope system is disclosed which divides an imaging target into small portions that are photographed, and which combines the images for the small portions thus obtained into a combined image for the imaging target which is displayed. In PTL 2, an image display system is disclosed which obtains partial images for an imaging target by capturing images while the stage of a microscope is being moved and corrects distortions in the images so as to combine the images. In PTL 2, a combined image having unobtrusive connecting regions is generated.

CITATION LIST

Patent Literature

PTL 1: Japanese Patent Laid-Open No. 2007-121837
PTL 2: Japanese Patent Laid-Open No. 2010-134374

A connecting region in a combined image obtained using the microscope system of PTL 1 and the image display system of PTL 2 is highly likely to be an image different from that obtained when a pathologist performs observation using an optical microscope, due to an adverse effect of artifacts caused by, for example, misregistration between partial images which inevitably occurs and distortion correction. Nevertheless, when diagnosis is made using a combined image without recognizing the possibility of such misdiagnosis, there arises a problem in that diagnosis is made on the basis of connecting regions in the combined image, hindering highly accurate diagnosis.

SUMMARY OF INVENTION

The present invention is essentially embodied in an image processing apparatus including image data acquisition means, combined-image data generation means, and combined-boundary-region display data generation means. The image data acquisition means acquires multiple pieces of divided image data obtained by capturing images of multiple regions into which a captured area for an imaging target is divided. The combined-image data generation means generates combined-image data on the basis of the multiple divided image data. The combined-boundary-region display data generation means generates display image data to be used for an observer to recognize combined boundary regions in the combined-image data. The combined-boundary-region display data generation means changes at least one of a color and a brightness for all of the combined boundary regions included in a display area.

In addition, the present invention is essentially embodied in a microscope image display system including at least the image processing apparatus and an image display apparatus. The image display apparatus displays combined-image data which is for the imaging target and which is transmitted from the image processing apparatus, and image data to be used for an observer to recognize the combined boundary regions.

Further, the present invention is essentially embodied in an image processing method including acquiring multiple pieces of divided image data obtained by capturing images of multiple regions into which a captured area for an imaging target is divided, generating combined-image data on the basis of the multiple divided image data, and generating display image data to be used for an observer to recognize combined boundary regions in the combined-image data. In the generating of display image data, at least one of a color and a brightness is changed for all of the combined boundary regions included in a display area.

Furthermore, the present invention is essentially embodied in a program causing a computer to execute a process including acquiring multiple pieces of divided image data obtained by capturing images of multiple regions into which a captured area for an imaging target is divided, generating combined-image data on the basis of the multiple divided image data, and generating display image data to be used for an observer to recognize combined boundary regions in the combined-image data. In the generating of display image data, at least one of a color and a brightness is changed for all of the combined boundary regions included in a display area.

Further features of the present invention will become apparent from the following description of exemplary embodiments with reference to the attached drawings.

BRIEF DESCRIPTION OF DRAWINGS

FIG. 4 is an exemplary hardware configuration diagram for an image processing apparatus according to the present invention.

DESCRIPTION OF EMBODIMENTS

Figure 1:
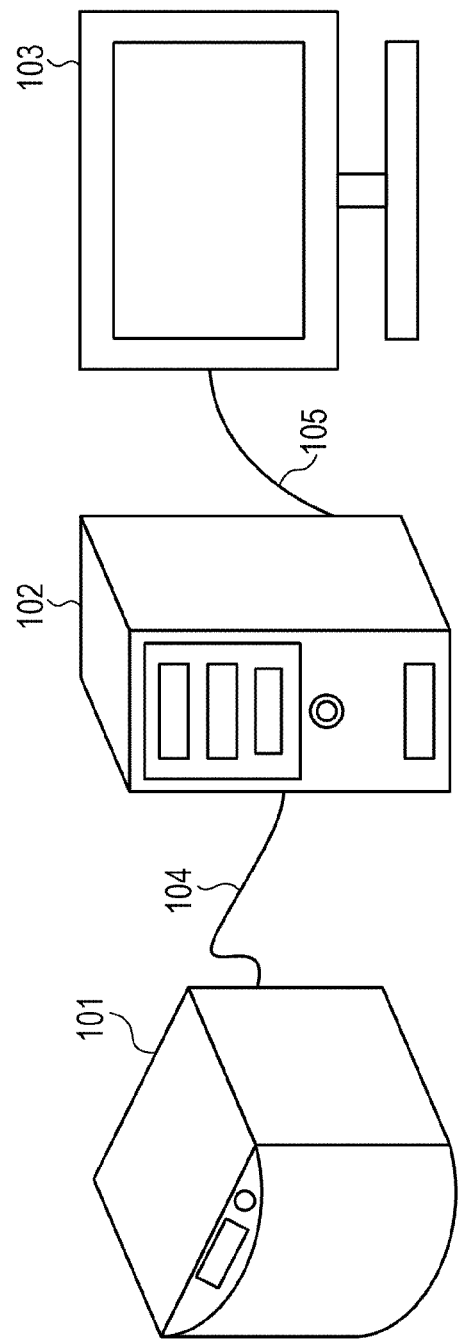
FIG. 1 is an exemplary overall view of the apparatus configuration of an image display system using an image processing apparatus according to the present invention.

Embodiments of the present invention will be described below with reference to the drawings. The entire description below is about preferable embodiments of the present invention, and the present invention is not limited to this.

A preferable image processing apparatus according to the present invention includes image data acquisition means, combined-image data generation means, and combined-boundary-region display data generation means. The image data acquisition means acquires multiple pieces of divided image data obtained by capturing images of multiple regions into which a captured area for an imaging target is divided. The combined-image data generation means generates combined-image data on the basis of the multiple divided image data. The combined-boundary-region display data generation means generates display image data to be used for an observer to recognize combined boundary regions in the combined-image data. The combined-boundary-region display data generation means changes at least one of a color and a brightness for all of the combined boundary regions included in a display area. Thus, when images (data) captured by dividing the region for an imaging target to be photographed into small portions are combined so that an image (data) of the imaging target is generated, the case can be prevented in which it is difficult to perform highly accurate diagnosis using the combined boundary regions due to display of the combined image (data) which may be different from the original image of the imaging target. The image processing apparatus according to the present invention can be applied to an image obtained using a microscope. In addition, the image processing apparatus according to the present invention can be used in an image display system, and particularly in a microscope image display system or a virtual slide system.

Examples of a method for combining images (data) which is used herein include connection of pieces of image data (hereinafter, may be also referred to as "partial image data"), superimposition of pieces of partial image data, alpha-blending of pieces of partial image data, and interpolation to combine pieces of partial image data smoothly. Examples of the method for connecting pieces of image data to be overlapped include a method in which the pieces of image data are connected by aligning them on the basis of the position information of the stage, a method in which the pieces of image data are connected by associating the corresponding points or the corresponding lines in the pieces of divided image, and a method in which the pieces of image data are connected on the basis of the position information of the divided image data. Superimposition means that pieces of image data overlap in a broad sense. Examples of the method for superimposing pieces of image data include a case where portions or the entireties of the pieces of image data overlap in a region having overlapped image data. Alpha-blending indicates that two images are combined using a coefficient ($\alpha$ value). Examples of the method in which interpolation is performed to connect pieces of image data smoothly include a process using zero-order interpolation, a process using linear interpolation, and a process using higher-degree interpolation. To connect images smoothly, a process using higher-degree interpolation is preferable.

The combined-boundary-region display data generation means is means for generating data to be used for an observer to visually recognize the combined boundary regions in the displayed image.

A combined boundary region is obtained when image data is combined, and is a connecting region between pieces of original partial image data or a region which is in a combined image and in which image data whose appearance is difference from that of the original partial image data is generated due to a combining process. When a combined boundary region is displayed, an observer needs to recognize the combined boundary regions visually. Therefore, a connecting region between pieces of original partial image data is to be an area, not merely a line, which includes a certain degree of surrounding area. The width of the certain degree of surrounding area may depend on a display magnification.

The term "data for displaying a combined boundary region" is not merely data about a combined boundary region (such as position information of the combined boundary region), but one of the followings: data, on the basis of which combined-image data is processed so that combined boundary regions in an image to be displayed can be visually recognized; and a portion of data (which is included in combined-image data) which is rewritten so as to be changed into data different from partial image data so that combined boundary regions in the combined-image data can be visually recognized.

The combined-boundary-region display data generation means may extract combined boundary regions after combined-image data is generated, so as to generate image data to be used for an observer to recognize the combined boundary regions, or may generate image data to be used for an observer to recognize combined boundary regions, on the basis of, for example, position information of divided image data.

The generation of combined-image data and the generation of image data to be used for an observer to recognize combined boundary regions are performed in any sequence, and, for example, may be simultaneously performed. As the method for displaying a combined boundary region, the color or the brightness is preferably changed.

Preferably, the image processing apparatus obtains the pieces of divided image data by using the image data acquisition means which captures microscope images (optical microscope images), and uses the obtained data in a virtual slide system.

The image data acquisition means may acquire pieces of divided image data obtained by capturing images in such a manner that the pieces of divided image data have overlapped regions, and the combined-boundary-region display data generation means may generate area data in which the pieces of divided image data overlap, as image data to be used for an observer to recognize the combined boundary regions.

When pieces of divided image data are obtained by capturing images in such a manner that the pieces of divided image data have overlapped regions, the combined-image data generation means preferably performs superimposition or blending on the pieces of divided image data so as to generate combined-image data.

When pieces of divided image data are obtained by capturing images in such a manner that the pieces of divided image data have overlapped regions, the combined-image data generation means preferably interpolates the regions in which the pieces of divided image data overlap, so as to generate combined-image data.

The combined-image data generation means may combine pieces of divided image data so as to generate combined-image data to be displayed, and the combined-boundary-region display data generation means may generate a line for a region in which the pieces of divided image data are connected, as combined-boundary-region data.

Preferably, the image processing apparatus further includes combined-boundary-region data switching means that performs switching of image data to be used for an observer to recognize the combined boundary regions generated by the combined-boundary-region display data generation means. The combined-boundary-region data switching means may preferably switch the mode of display of combined boundary regions between a mode in which the combined boundary regions are displayed and a mode in which the combined boundary regions are not displayed.

The combined-boundary-region data switching means preferably performs switching of image data to be used for an observer to recognize the combined boundary regions generated by the combined-boundary-region display data generation means, at a certain boundary. As a certain boundary, a predetermined magnification or a predetermined scroll speed (of an image displayed on the image display apparatus) may be used. For example, only in the case of a magnification higher than a certain magnification or in the case of a scroll speed (of an image displayed on the image display apparatus) lower than a certain speed, it is preferable to generate image data to be used for an observer to recognize the combined boundary regions.

A preferable image display system according to the present invention includes at least the above-described image processing apparatus, and an image display apparatus that displays combined-image data which is for the imaging target and which is transmitted from the image processing apparatus, and that displays image data to be used for an observer to recognize the combined boundary regions in the combined-image data.

A preferable image processing method according to the present invention includes acquiring multiple pieces of divided image data obtained by capturing images of multiple regions into which a captured area for an imaging target is divided, generating combined-image data on the basis of the multiple divided image data, and generating display image data to be used for an observer to recognize combined boundary regions in the combined-image data. In the generating of display image data, at least one of a color and a brightness is changed for all of the combined boundary regions included in a display area. The generating of combined-image data and the generating of display image data may be simultaneously performed.

A preferable program according to the present invention causes a computer to execute a process including acquiring multiple pieces of divided image data obtained by capturing images of multiple regions into which a captured area for an imaging target is divided, generating combined-image data on the basis of the multiple divided image data, and generating display image data to be used for an observer to recognize combined boundary regions in the combined-image data. In the generating of display image data, at least one of a color and a brightness is changed for all of the combined boundary regions included in a display area.

The preferable aspects in the description about the image processing apparatus according to the present invention may be reflected in the image processing method or program according to the present invention.

First Embodiment

An image processing apparatus according to the present invention may be used in an image display system including an imaging apparatus and an image display apparatus. This image display system will be described by using FIG. 1.

Configuration of Image Pickup System

FIG. 1 illustrates an image display system using an image processing apparatus according to the present invention. The image display system includes an imaging apparatus (a microscope apparatus or a virtual slide scanner) 101, an image processing apparatus 102, and an image display apparatus 103, and has a function of obtaining and displaying two-dimensional images of an imaging target (sample to be examined) which is to be photographed. The imaging apparatus 101 and the image processing apparatus 102 are connected to each other through a cable 104 which is a dedicated I/F or a general-purpose I/F, whereas the image processing apparatus 102 and the image display apparatus 103 are connected to each other through a cable 105 which is a general-purpose I/F.

As the imaging apparatus 101, a virtual slide apparatus may be used which has a function of capturing multiple two-dimensional images at different positions in the two-dimensional direction and outputting digital images. A solid-state image sensing element, such as a charge-coupled device (CCD) or a complementary metal oxide semiconductor (CMOS), is used to obtain a two-dimensional image. Instead of a virtual slide apparatus, the imaging apparatus 101 may include a digital microscope apparatus in which a digital camera is attached to an eyepiece portion of a typical optical microscope.

The image processing apparatus 102 has, for example, a function of generating combined-image data by using multiple pieces of divided original image data obtained from the imaging apparatus 101. The image processing apparatus 102 is constituted by a general-purpose computer or workstation which includes hardware resources, such as a central processing unit (CPU), a RAM, a storage device, an operation unit, and an I/F. The storage device is a mass information storage device such as a hard disk drive, and stores, for example, programs, data, and an operating system (OS) for achieving processes described below. The above-described functions are achieved with the CPU loading necessary programs and data from the storage device onto the RAM and executing the programs. The operation unit is constituted by, for example, a keyboard and a mouse, and is used by an operator to input various instructions. The image display apparatus 103 is a monitor that displays the images for observation which are the results of computation performed by the image processing apparatus 102, and is constituted by, for example, a CRT or a liquid crystal display.

In the example in FIG. 1, an image pickup system is constituted by three apparatuses which are the imaging apparatus 101, the image processing apparatus 102, and the image display apparatus 103. However, the configuration of the present invention is not limited to this. For example, an image processing apparatus into which an image display apparatus is integrated may be used, or the function of an image processing apparatus may be incorporated into an imaging apparatus. Alternatively, the functions of an imaging apparatus, an image processing apparatus, and an image display apparatus may be achieved in a single apparatus. In contrast, the function of, for example, an image processing apparatus may be divided into small functions which are performed in multiple apparatuses.

Configuration of Imaging Apparatus

Figure 2:
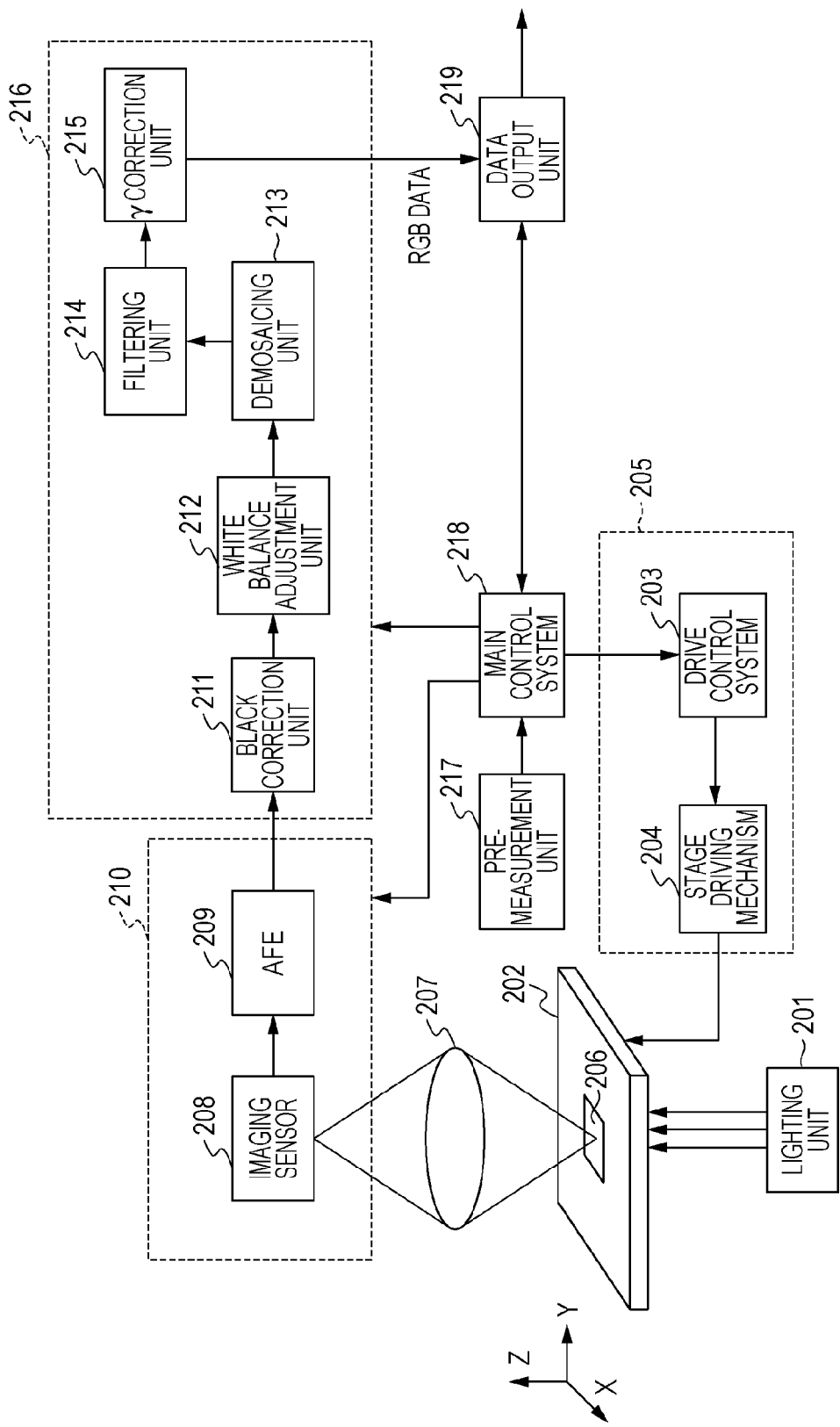
FIG. 2 is an exemplary functional block diagram for an imaging apparatus in an image display system using an image processing apparatus according to the present invention.

FIG. 2 is a block diagram illustrating the functional configuration of the imaging apparatus 101.

The imaging apparatus 101 generally includes a lighting unit 201, a stage 202, a stage control unit 205, an imaging optical system 207, an image pickup unit 210, a development processing unit 216, a pre-measurement unit 217, a main control system 218, and a data output unit 219.

The lighting unit 201 is means which uniformly irradiates, with light, a preparation 206 located on the stage 202, and includes a light source, an illumination optical system, and a control system for driving the light source. The stage 202 is driven and controlled by the stage control unit 205, and can be moved in the three XYZ axes. The preparation 206 is a member in which a slice of tissue or smear cells which serve as an observation object are put onto the slide glass so as to be held together with a mounting agent under the cover glass.

The stage control unit 205 includes a drive control system 203 and a stage driving mechanism 204. The drive control system 203 receives an instruction from the main control system 218, and controls driving of the stage 202. The movement direction, the movement amount, and the like of the stage 202 are determined on the basis of the position information and the thickness information (distance information) of an imaging target which are measured by the pre-measurement unit 217, and on the basis of an instruction from a user when necessary. The stage driving mechanism 204 drives the stage 202 in accordance with an instruction from the drive control system 203.

The imaging optical system 207 is a lens unit for forming an optical image of an imaging target on the preparation 206 onto an imaging sensor 208.

The image pickup unit 210 includes the imaging sensor 208 and an analog front end (AFE) 209. The imaging sensor 208 is a one-dimensional or two-dimensional image sensor which converts a two-dimensional optical image into an electrical physical quantity through photoelectric conversion, and, for example, a CCD or CMOS device is used. When a one-dimensional sensor is used, a two-dimensional image is obtained by performing scanning in a scanning direction. An electric signal having a voltage value according to light intensity is output from the imaging sensor 208. In the case where a color image is desired as a captured image, for example, a single-chip image sensor to which a color filter using a Bayer array is attached may be used. The image pickup unit 210 captures divided images for an imaging target with the stage 202 being driven in the XY axes directions.

The AFE 209 is a circuit that converts an analog signal which is output from the imaging sensor 208 into a digital signal. The AFE 209 includes an H/V driver, a correlated double sampling (CDS), an amplifier, an AD converter, and a timing generator, which are described below. The H/V driver converts a vertical synchronizing signal and a horizontal synchronizing signal for driving the imaging sensor 208 into a potential which is necessary to drive the sensor. The CDS is a correlated double sampling circuit which removes fixed-pattern noise. The amplifier is an analog amplifier which adjusts a gain of an analog signal which has been subjected to noise reduction in the CDS. The AD converter converts an analog signal into a digital signal. In the case where an output from the final stage of the imaging apparatus is 8-bit, the AD converter converts an analog signal into digital data obtained through quantization from 10 bits to the order of 16 bits, with consideration of downstream processes, and outputs the digital data. The converted sensor output data is called RAW data. The RAW data is subjected to a development process in the development processing unit 216 which is located downstream. The timing generator generates a signal for adjusting timing for the imaging sensor 208 and timing for the development processing unit 216 which is located downstream.

In the case where a CCD is used as the imaging sensor 208, the above-described AFE 209 is necessary. In contrast, in the case where a CMOS image sensor which can output a digital output is used, the sensor includes the function of the above-described AFE 209. In addition, an image pickup controller (not illustrated) which controls the imaging sensor 208 is present, and not only controls the operations of the imaging sensor 208 but also is responsible for operation timing and control for a shutter speed, a frame rate, and a region of interest (ROI), and the like.

The development processing unit 216 includes a black correction unit 211, a white balance adjustment unit 212, a demosaicing unit 213, a filtering unit 214, and a γ correction unit 215. The black correction unit 211 subtracts data for black correction obtained with light being shielded, from each of the pixels of the RAW data. The white balance adjustment unit 212 adjusts a gain of each of the RGB colors in accordance with the color temperature of light from the lighting unit 201 so as to reproduce desired white. Specifically, data for white balance correction is added to the RAW data after the black correction. In the case where a monochrome image is handled, the white balance adjustment process is not necessary. The development processing unit 216 generates divided image data for an imaging target photographed by the image pickup unit 210.

The demosaicing unit 213 generates image data for each of the RGB colors from the RAW data according to the Bayer array. The demosaicing unit 213 calculates RGB-color values of a target pixel through interpolation using values of the surrounding pixels (including pixels of the same color and pixels of the other colors) in the RAW data. In addition, the demosaicing unit 213 performs a correction process (interpolation process) on a defective pixel. In the case where the imaging sensor 208 has no color filters and where a monochrome image is obtained, the demosaicing process is not necessary.

The filtering unit 214 is a digital filter which achieves suppression of high-frequency components included in an image, noise reduction, and emphasis of high resolution. The γ correction unit 215 adds the inverse of gradation expression characteristics of a typical display device to an image, and performs gradation conversion in accordance with the visual property of a man through gradation compression in a high-luminance portion or dark processing. According to the present embodiment, to obtain an image for morphological observation, image data is subjected to gradation conversion which is adequate for a combined process and a display process which are located downstream.

The pre-measurement unit 217 performs pre-measurement for calculating position information of an imaging target on the preparation 206, distance information to a desired focal position, and parameters for light-quantity adjustment caused by the thickness of the imaging target. The pre-measurement unit 217 obtains information before the main measurement, enabling images to be efficiently captured. To obtain position information in a two-dimensional plane, a two-dimensional imaging sensor having a resolution lower than that of the imaging sensor 208 is used. The pre-measurement unit 217 determines the position of an imaging target in the XY plane from an obtained image. A laser displacement sensor or a Shack-Hartmann measuring device is used to obtain the distance information and the thickness information.

The main control system 218 controls various units described above. The functions of the main control system 218 and the development processing unit 216 are achieved by a control circuit having a CPU, a ROM, and a RAM. That is, the ROM stores programs and data, and the CPU uses the RAM as a work memory so as to execute the programs, achieving the functions of the main control system 218 and the development processing unit 216. A device, such as an EEPROM or a flash memory, is used as the ROM, and a DRAM device such as DDR3 is used as the RAM.

The data output unit 219 is an interface for transmitting an RGB color image generated by the development processing unit 216 to the image processing apparatus 102. The imaging apparatus 101 and the image processing apparatus 102 are connected to each other through an optical communications cable. Alternatively, an interface, such as a USB or a GigabitEthernet (registered trademark) is used.

Configuration of Image Processing Apparatus

Figure 3:
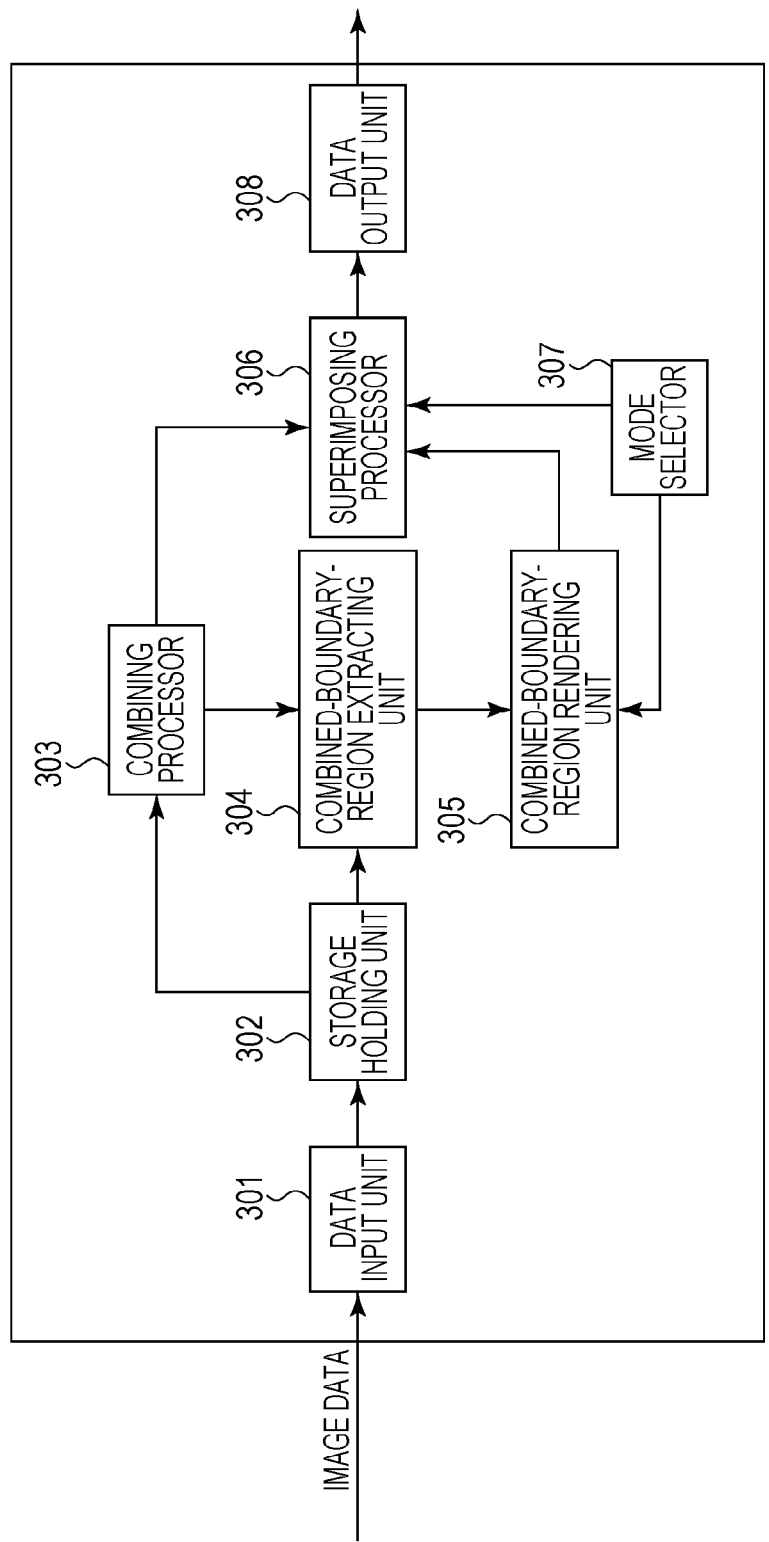
FIG. 3 is an exemplary functional block diagram for an image processing apparatus according to the present invention.

FIG. 3 is a block diagram illustrating the functional configuration of the image processing apparatus 102 according to the present invention.

The image processing apparatus 102 generally includes data input/output units 301 and 308, a storage holding unit 302, a combining processor 303, a combined-boundary-region extracting unit 304, a combined-boundary-region rendering unit 305, a superimposing processor 306, and a mode selector 307.

The storage holding unit 302 receives, via the data input unit 301, divided color image data of RGB which is obtained from an external apparatus and which is obtained by photographing divided portions of an imaging target, and stores and holds the data. The color image data includes not only image data but also position information. The position information is information describing which piece of divided image data corresponds to which photographed portion of the imaging target. For example, the position information may be obtained by recording the XY coordinates of the stage 202 which is being driven, as well as divided image data, when the divided image data is captured.

The combining processor 303 generates combined-image data for the imaging target by using the color image data (divided image data) obtained by photographing the divided portions of the imaging target, on the basis of the position information of the pieces of divided image data.

The combined-boundary-region extracting unit 304 extracts combined boundary regions which have been subjected to, for example, interpolation, in the combined-image data generated by the combining processor 303. For example, when the pieces of divided image data are connected in a simple manner, connecting regions are extracted as a combined boundary region. When the pieces of divided image data are smoothly connected through, for example, interpolation, connecting regions to which the interpolation or the like has been applied are extracted as a combined boundary region. In the present embodiment, it is assumed that images are captured in such a manner that areas corresponding to connecting regions overlap each other, and that an interpolation process is applied to the obtained pieces of divided image data so that the pieces of divided image data are smoothly connected.

The mode selector 307 selects a mode with which combined boundary regions are displayed. As the mode with which combined boundary regions are displayed, change of the color, change of the brightness, display of a dotted line, blinking, or the like is specified. The detail will be described by using FIGS. 5A and 5B.

The combined-boundary-region rendering unit 305 renders combined boundary regions extracted by the combined-boundary-region extracting unit 304, by using the mode selected by the mode selector 307.

The superimposing processor 306 superimposes the rendered data for combined boundary regions which have been rendered by the combined-boundary-region rendering unit 305 on the combined-image data generated by the combining processor 303. In the combined-image data which is obtained after the superimposing process and in which the connecting regions which have been generated overlap, regions which have been subjected to the combining process are distinguished from the original divided image data which is not subjected to the combining process. The combined-image data which is obtained after the superimposing process and in which the combined boundary regions are distinguished is transmitted via the data output unit 308 to, for example, an external monitor.

Hardware Configuration of Image Processing Apparatus

FIG. 4 is a block diagram illustrating the hardware configuration of the image processing apparatus according to the present invention. For example, a personal computer (PC) 400 is used as an information processing apparatus.

The PC 400 includes a central processing unit (CPU) 401, a hard disk drive (HDD) 402, a random access memory (RAM) 403, a data input/output unit 405, and a bus 404 which connects these to each other.

The CPU 401 accesses, for example, the RAM 403 when necessary as appropriate, and has overall control of entire blocks in the PC 400 while performing various computation processes. The hard disk drive (HDD) 402 is an auxiliary storage which permanently stores the OS executed by the CPU 401 and firmware, such as programs and various parameters, and which records and reads out information. The RAM 403 is used, for example, as a work area for the CPU 401, and temporarily stores the OS, various programs which are being executed, and various data which is to be processed, such as the combined image that is obtained after the superimposing process and that is a feature of the present invention.

The image display apparatus 103, an input apparatus 407, the imaging apparatus 101 which is an external apparatus, and the like are connected to the data input/output unit 405.

The image display apparatus 103 is a display device using, for example, liquid crystal, electro-luminescence (EL), or a cathode ray tube (CRT). It is assumed that the image display apparatus 103 is connected as an external apparatus. Alternatively, it may be assumed that the PC 400 is integrated with an image display apparatus.

Examples of the input apparatus 407 include a pointing device such as a mouse, a keyboard, a touch panel, and other operation input apparatuses. When the input apparatus 407 includes a touch panel, the touch panel may be integrated with the image display apparatus 103.

The imaging apparatus 101 is image pickup equipment, such as a microscope apparatus or a virtual slide scanner.

Display of Combined Boundary Region

The combined image after the superimposing process which is display data generated by the superimposing processor 306 included in the image processing apparatus according to the present invention and which is to be displayed on the image display apparatus 103 will be described by using FIGS. 5A and 5B.

Figure 5A:
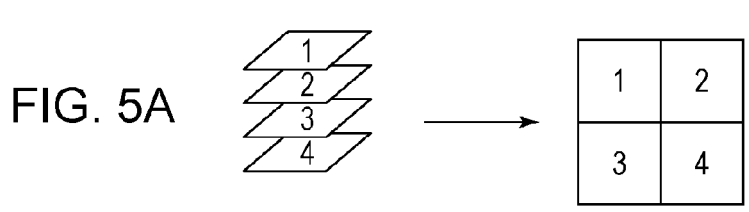
FIGS. 5A and 5B are diagrams for describing concepts of combined-image data generation and combined-boundary-region data generation according to a first embodiment.
Figure 5B:
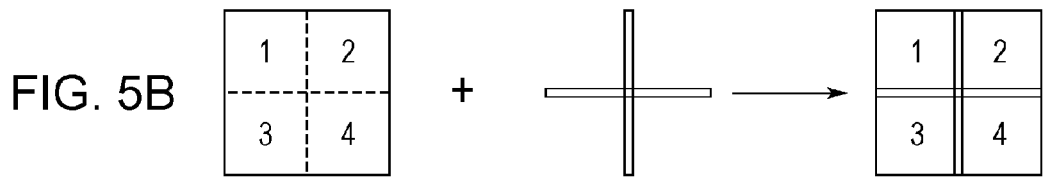

In the image processing apparatus according to the present invention, combined-image data is generated by combining pieces of image data obtained by photographing divided portions (FIG. 5A). By rendering combined boundary regions and superimposing them on the obtained combined-image data, combined-image data after the superimposing process in which the combined boundary regions are distinguished is obtained (FIG. 5B).

As a method for generating data to be used to display combined boundary regions and displaying the generated data, for example, the following methods may be used: a method in which the data is generated by changing the color information of the combined boundary regions; a method in which the data is generated by changing the brightness information of the combined boundary regions; a method in which the data is generated by displaying grids in the center regions (center lines) of the combined boundary regions; a method in which the combined boundary regions are displayed with markers such as arrows; and a method in which the rendered combined boundary regions are switched in a time division manner and in which blinking is displayed to indicate whether or not superimposition has been performed. The method in which the display data is generated by changing the color of the combined boundary regions is preferable because the areas for the combined boundary regions are distinguished from the other regions. The method in which the display data is generated by changing the brightness of the combined boundary regions is preferable because the areas for the combined boundary regions are distinguished from the other regions and the image data for the combined boundary regions required in diagnosis can be used.

Method for Displaying Combined Boundary Regions

The flow of generation of the combined-boundary-region display data in the image processing apparatus according to the present invention will be described using the flowchart in FIG. 6.

In step S601, in the image processing apparatus 102, pieces of image data (divided image data) which are obtained by dividing the region of an imaging target to be photographed into multiple regions and photographing the obtained regions are obtained from, for example, the imaging apparatus 101 which is an external apparatus via the data input/output unit 301, and are transmitted to the storage holding unit 302.

In step S602, the position information included in the divided image data stored in the storage holding unit 302 or the position information attached to the divided image data as separate data is grasped. The position information is information describing which piece of divided image data corresponds to which photographed portion of the imaging target.

In step S603, the combining processor 303 combines the divided image data on the basis of the grasped position information, and generates combined-image data for the imaging target. Examples of the combining method include connection of pieces of partial image data, superimposition of pieces of partial image data, alpha-blending of pieces of partial image data, and interpolation to combine pieces of partial image data smoothly. Examples of the method for connecting pieces of image data to be overlapped include a method in which the pieces of image data are connected by aligning them on the basis of the position information of the stage, a method in which the pieces of image data are connected by associating the corresponding points or the corresponding lines in the pieces of divided image, and a method in which the pieces of image data are connected on the basis of the position information of the divided image data. Superimposition means that pieces of image data overlap in a broad sense. Examples of the method for superimposing pieces of image data include a case where portions or the entireties of the pieces of image data overlap in a region having overlapped image data. Alpha-blending indicates that two images are combined using a coefficient ($\alpha$ value). Examples of the method in which interpolation is performed to connect pieces of image data smoothly include a process using zero-order interpolation, a process using linear interpolation, and a process using higher-degree interpolation. To connect images smoothly, a process using higher-degree interpolation is preferable.

In step S604, the mode selector 307 selects a method for displaying the combined boundary regions. The mode selector 307 first selects whether or not the combined boundary regions are to be displayed. If the combined boundary regions are to be displayed, the mode selector 307 selects how the display appears. For example, as the display method, a display mode, such as change of the color or change of the brightness, is selected.

In step S605, it is determined whether or not the combined boundary regions are to be displayed in the combined image. If it is determined that the combined boundary regions are not to be displayed in the combined image, the image data is transmitted to the outside via the data output unit 308 without rendering the combined boundary regions or superimposing the rendered combined boundary regions in the superimposing processor 306. If it is determined that the combined boundary regions are to be displayed in the combined image, the process proceeds to the next step S606.

In step S606, areas for the combined boundary regions are extracted from the generated combined-image data on the basis of the position information.

In step S607, the combined-boundary-region rendering unit 305 generates rendered data for the combined boundary regions extracted in step S606 by using the display method selected in step S604. The detail of generation of the combined-boundary-region rendered data will be described below using another flowchart.

In step S608, the superimposing processor 306 superimposes the combined-boundary-region rendered data generated in step S607 on the combined-image data obtained in step S603, and obtains combined-image data which is obtained after the superimposing process and in which the combined boundary regions are distinguished from the other regions. The detail of the superimposing process will be described below using another flowchart.

Rendering Connecting Regions

Figure 7:
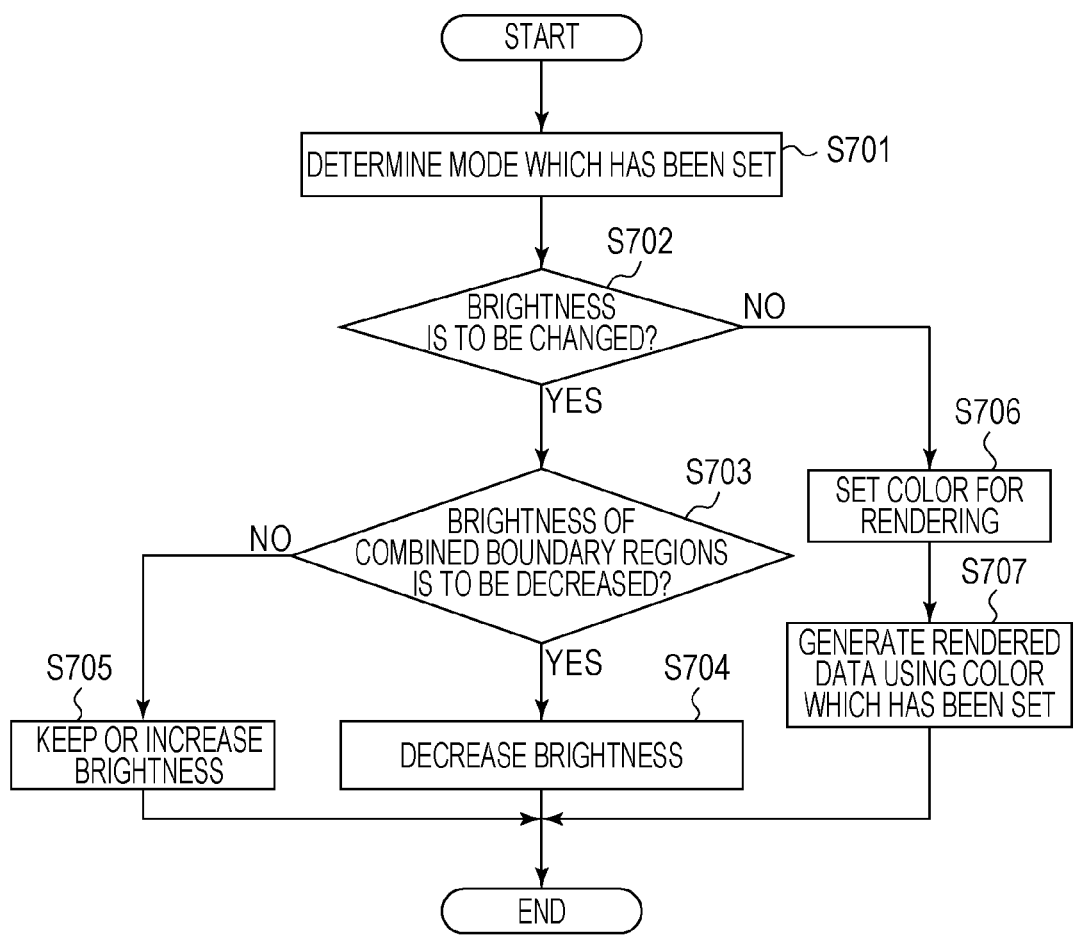
FIG. 7 is an exemplary flowchart of generation of combined-boundary-region rendered data.

FIG. 7 is a flowchart of generation of the rendered data for the connecting regions which are combined boundary regions. The flow in the case where display is performed by changing the brightness or the color of the combined boundary regions will be described using FIG. 7.

In step S701, the mode which has been set by the mode selector 307 is determined. In this step, whether the brightness or the color is to be changed in rendering combined boundary regions is determined.

In step S702, it is determined whether or not the brightness is to be changed in rendering of the combined boundary regions. If the brightness is to be changed, the process proceeds to step S703. If the brightness is not to be changed, the process proceeds to step S706.

In step S703, it is determined whether or not the brightness is to be changed by decreasing the brightness of the combined boundary regions. If the brightness of the combined boundary regions is to be relatively decreased compared with that of the area other than the combined boundary regions, the process proceeds to step S704. If the brightness of the combined boundary regions is not to be decreased, that is, the brightness of the area other than the combined boundary regions is to be changed or the brightness of the combined boundary regions is to be increased, the process proceeds to step S705.

In step S704, rendered data for the combined boundary regions in the combined image is generated with the brightness being decreased.

In step S705, rendered data for the combined boundary regions is generated with the brightness being not changed or being increased.

In step S706, to change the color, the color used when the combined boundary regions are displayed is set.

In step S707, rendered data for the combined boundary regions is generated on the basis of the color which has been set in step S706.

Superimposing Combined-Boundary-Region Rendered Data

Figure 8:
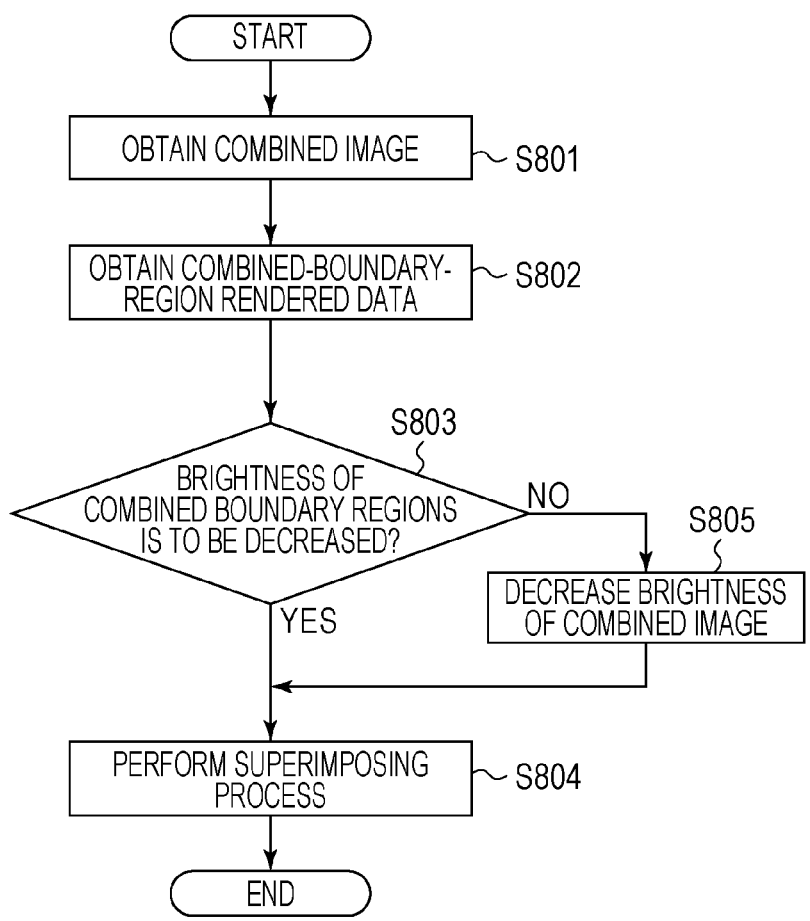
FIG. 8 is an exemplary flowchart of a superimposing process.

FIG. 8 is a flowchart of superimposition of the combined-boundary-region rendered data on the combined image. In FIG. 8, the combined-boundary-region rendered data is superimposed on the combined-image data. When change of the brightness is selected as the rendering method for combined boundary regions, one of the display methods is to decrease the brightness of the combined image so that the combined boundary regions are distinguished from the other regions. Decrease in the brightness of the combined image is advantageous when the combined boundary regions are to be investigated while the displayed image is being observed.

In step S801, the combined-image data which has been generated through the combination performed by the combining processor 303 is obtained.

In step S802, the combined-boundary-region rendered data generated by the combined-boundary-region rendering unit 305 is obtained.

In step S803, it is determined whether or not the brightness of the combined boundary regions is to be decreased on the basis of the setting of the rendering method for the combined boundary regions which has been determined in step S701. If the brightness of the combined boundary regions is to be relatively decreased compared with that of the area other than the combined boundary regions, the process proceeds to step S804. If the brightness of the combined boundary regions is not to be decreased, that is, the brightness of the area other than the combined boundary regions is to be changed, the process proceeds to step S805. In step S805, the brightness of the combined boundary regions in the combined image is decreased.

In step S804, to decrease the brightness of the combined boundary regions relatively compared with that of the area other than the combined boundary regions, the combined-boundary-region rendered data in which the brightness of the combined boundary regions is decreased is superimposed on the combined-image data generated in step S603. Examples of the superimposing process include a process in which each of the pieces of image data is subjected to alpha-blending so that a superimposed image is generated, in addition to a process in which a superimposed image is generated by over-writing the combined-boundary-region rendered data on the combined-image data.

Display Screen Layout

FIGS. 9A to 9E describe an example of the case where image data for display which is generated by the image processing apparatus 102 according to the present invention is displayed on the image display apparatus 103.

Figure 9A:
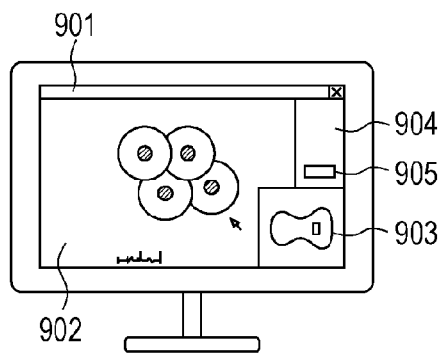
FIGS. 9A to 9E illustrate an exemplary display screen of an image display system according to the present invention.

FIG. 9A illustrates a layout of the screen of the image display apparatus 103. In a whole window 901 in the screen, a display area 902 for image-pickup-target image data which is used for detailed observation, a thumbnail image 903 for the imaging target to be observed, and a display setting area 904 are displayed. These areas may be displayed in the single document interface in such a manner that the display area in the whole window 901 is separated into functional areas, or may be displayed in the multiple document interface in such a manner that each area is displayed in a separate window. In the display area 902 for image-pickup-target image data, the image data for the imaging target which is used for detailed observation is displayed. Instructions for operation from a user cause movement of the display area (selection and movement of a partial area which is to be observed in the entire imaging target), and display of an enlarged or reduced image due to a change of display magnification. The thumbnail image 903 indicates the position and the size of the display area 902 for image-pickup-target image data with respect to the entire image of the imaging target. In the display setting area 904, for example, a setup button 905 is selected and pressed through a user instruction from the input apparatus 407, such as a touch panel or a mouse, which is externally connected, whereby the display setting can be changed.

Figure 9B:
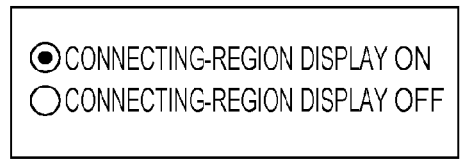

FIG. 9B illustrates a display setting screen which is displayed as a dialog box when the setup button 905 is selected and pressed and in which whether or not connecting regions that are combined boundary regions in the combined image are to be displayed is selected. In the present embodiment, it is assumed that a setup button is provided and a setting screen is opened by pressing the button. Alternatively, a UI in which various detailed settings illustrated in FIG. 9C can be displayed, selected, and changed may be provided directly on the display setting area 904. Instead, a screen may be displayed in which a list for detailed settings including whether or not combined boundary regions are to be displayed is integrally displayed.

Figure 9C:
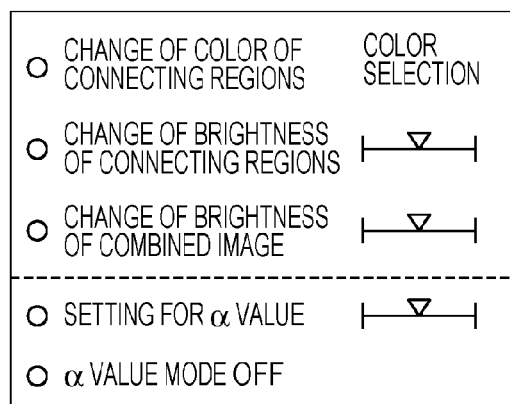

FIG. 9C illustrates a display setting screen which is for connecting regions and which is displayed as a dialog box when the connecting regions that are combined boundary regions are to be displayed. In the display setting screen, how the connecting regions which are the combined boundary regions in the combined image are displayed is selected or set. Specifically, a display method for connecting regions which are combined boundary regions is selected from, for example, the following choices: change of the color of the connecting regions; change of the brightness of the connecting regions; and change of the brightness of the combined image. The selection of change of the color and the selection of change of the brightness are mutually exclusive. When the color of connecting regions is to be changed, a color for the connecting regions can be selected. In the change of color, it is possible to further provide a list of color samples to allow a user to select a desired color. In the case where the brightness of the areas for the combined boundary regions is to be changed, or where the brightness of the area other than the combined boundary regions is to be changed, the degree to which the brightness is to be changed can be set. In change of the brightness, the following cases may be assumed: a case where an intuitive interface using, for example, a slider is used; and a case where a numeric value is input to change the brightness relatively with respect to the current brightness. In addition, it is possible to set an α value for images which are to be superimposed, when the combined boundary regions are subjected to the superimposing process, so as to set display of a semitransparent superimposed image.

Figure 9D:
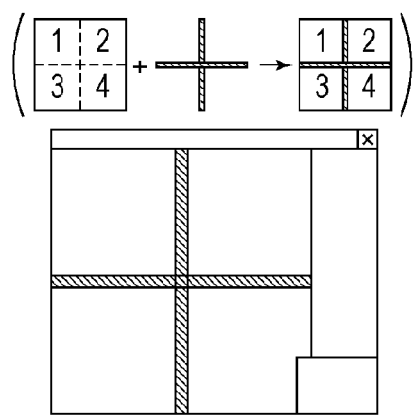
Figure 9E:
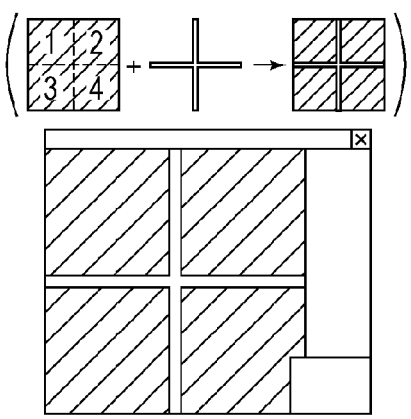

FIG. 9D illustrates an exemplary display screen displayed when the color of combined boundary regions is changed. In this example, an image is rendered using a particular color as the color of the cross-shaped connecting region which is a combined boundary region in four pieces of partial image data, whereby the position of the connecting region and relationship between the pieces of partial image data can be grasped. FIG. 9E illustrates an exemplary display screen in which the combined boundary region is distinguished from the other regions by decreasing the brightness of the combined image other than the combined boundary region. In this example, the brightness of the area other than the combined boundary region in four pieces of partial image data is decreased, whereby cells and pieces of tissue in the combined boundary regions can be intensively observed.

Change of Display of Combined-Boundary-Region Area

Figure 10:
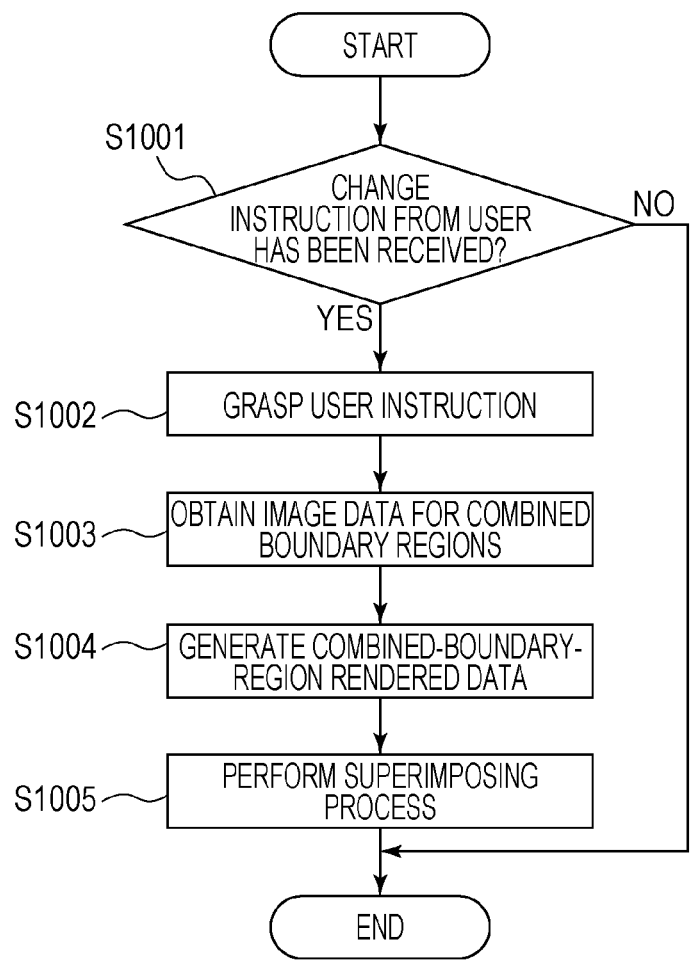
FIG. 10 is an exemplary flowchart of switching of display performed by switching means of an image processing apparatus according to the present invention.

After the combined boundary regions in the combined-image data are displayed in a manner desired by a user, the mode for the display of the combined boundary regions can be further changed through an instruction from the user. The flow in which the mode for the display of the combined-boundary-region area (superimposing process) is changed will be described by using the flowchart in FIG. 10.

In step S1001, it is determined whether or not an instruction from a user to change the display of the combined boundary regions has been received. If an instruction has been received, the process proceeds to step S1002. If an instruction has not been received, the current display is maintained.

In step S1002, the instruction from the user about the mode for the display of the combined boundary regions is grasped.

In step S1003, image data for the combined boundary regions is obtained. This process is the same as that in step S606 in FIG. 6.

In step S1004, the combined-boundary-region rendering unit 305 generates combined-boundary-region rendered data by using the display method determined in step S1002. This process of generating combined-boundary-region rendered data is the same as that in FIG. 7.

Figure 6:
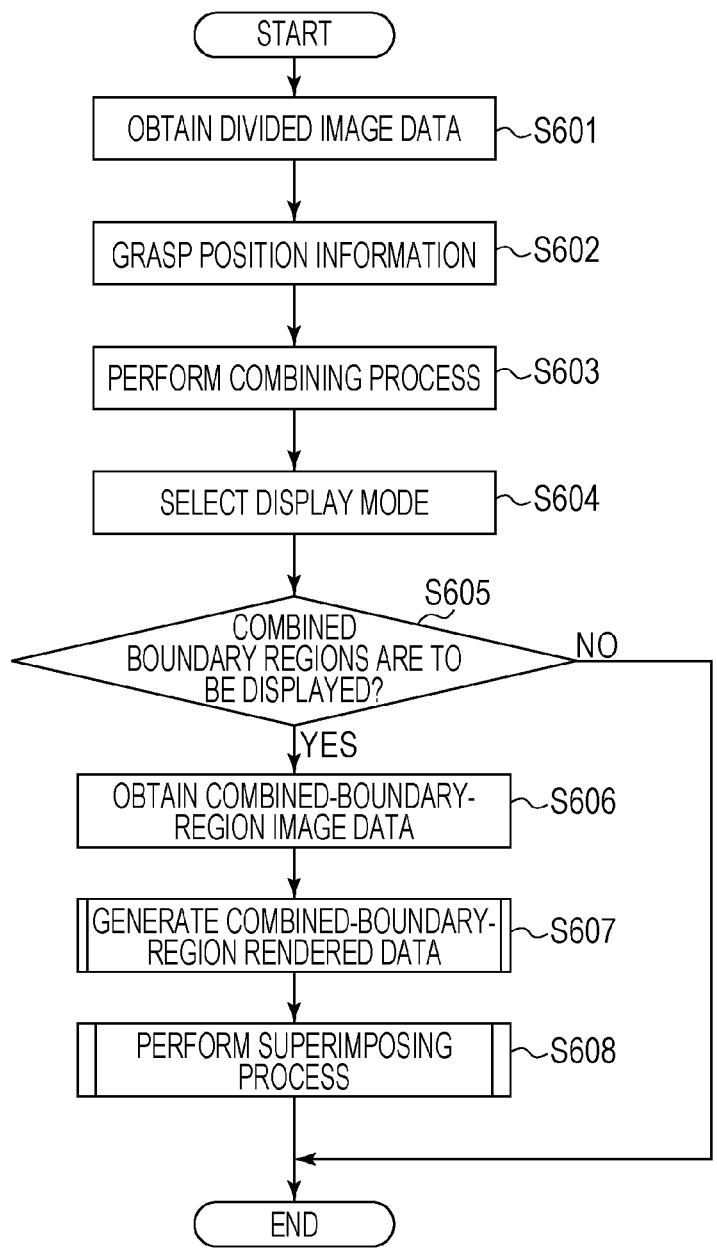
FIG. 6 is an exemplary flowchart of generation of combined-boundary-region display data in an image processing apparatus according to the present invention.

In step S1005, the combined-boundary-region rendered data generated in step S1004 is superimposed on the combined image described in step S603 in FIG. 6, and combined-image data which is obtained after the superimposing process and in which the combined boundary regions are distinguished from the other regions is obtained. This superimposing process is the same as that in FIG. 8.

Thus, the display method for combined boundary regions in an observation image can be changed depending on an instruction or an intention of a user. For example, in the case where an image is observed in the state in which a display method in which the brightness of combined boundary regions is decreased is selected, when the area of interest is shifted from an area other than the combined boundary regions to an area in the combined boundary regions, the brightness of the combined boundary regions is returned back to the original value, and instead, the brightness of the area other than the combined boundary regions is decreased. Accordingly, a smooth morphological observation of pieces of tissue and cells can be performed while attention is being paid to the combined boundary regions.

In the present embodiment, it is possible to perform the following sequence of processes: combined-boundary-region rendered data is superimposed on the entire combined-image data in advance; a region of the superimposed combined image which is to be displayed on the image display apparatus 103 is selected; and the selected region is output on the image display apparatus 103. Alternatively, when necessary, combined-boundary-region rendered data corresponding to a region to be displayed on the image display apparatus 103 can be superimposed and output.

By distinguishing combined boundary regions in the observation image from the other regions, the case is prevented in which it is difficult to perform highly accurate diagnosis using the combined boundary regions. In particular, in the present embodiment, the case where a combined boundary region has a certain amount of connected area obtained through interpolation is assumed. Accordingly, an observation image is displayed, and at the same time, the combined boundary regions are distinguished through change of the brightness thereof, whereby diagnostic imaging can be performed without hindering the diagnosis process.

Second Embodiment

An image display system according to a second embodiment of the present invention will be described using figures.

In the first embodiment, display data to be displayed by changing the color or the brightness of combined boundary regions is generated for combined image data in which, for example, interpolation is applied to pieces of image data obtained by photographing divided portions. In the second embodiment, using a combined image in which images obtained by photographing divided portions are aligned along one-dimensional connecting regions (lines), display data to be displayed in such a manner that the lines for the connecting regions are distinguished is generated.

Examples of the image combining method include a method in which, depending on only the position accuracy of the stage, images are aligned on the basis of the position information of the stage, and a method in which the positions of the pixels in obtained divided image data are changed through a geometric transform such as an affine transform and in which the images are combined at ideal positions of connecting regions. Other than components that are different from those in the first embodiment, the configuration described in the first embodiment can be used in the second embodiment.

System Configuration of Image Processing Apparatus

Figure 11:
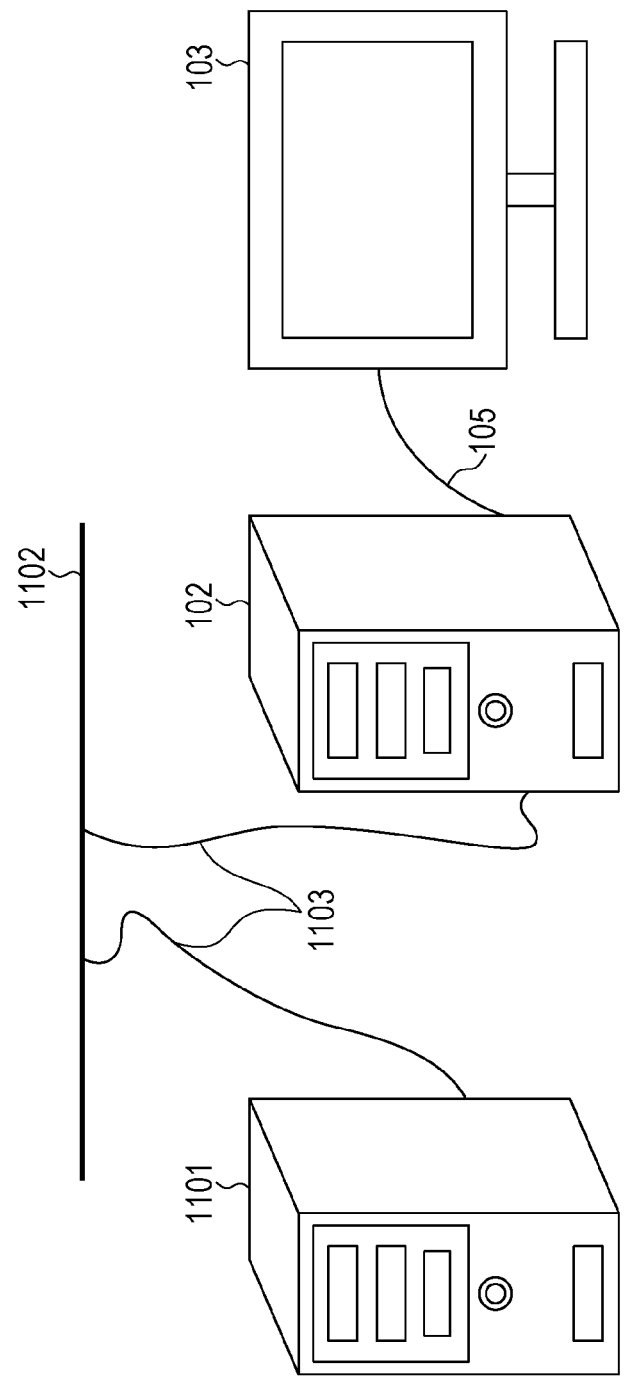
FIG. 11 is an overall view of an image display system using an image processing apparatus according to a second embodiment.

FIG. 11 is an overall view of the apparatus configuration of an image display system according to the second embodiment of the present invention.

In FIG. 11, the image display system using an image processing apparatus according to the present invention includes an image server 1101, the image processing apparatus 102, and the image display apparatus 103. The image processing apparatus 102 can obtain divided images for an imaging target from the image server 1101, and can generate image data to be displayed on the image display apparatus 103. The image server 1101 and the image processing apparatus 102 are connected with a LAN cable 1103 which is a general-purpose I/F via a network 1102. The image server 1101 is a computer including a large-capacity storage device which stores divided image data captured by the imaging apparatus 101 which is a virtual slide apparatus. The image server 1101 may store divided images as a group in a local storage connected to the image server 1101. Alternatively, the image server 1101 may be constituted by servers (cloud servers) that are separately present somewhere on the network, and may have each piece of the divided image data itself and its link information separately. It is not necessary for the divided image data itself to be stored in one server. The image processing apparatus 102 and the image display apparatus 103 are similar to those of the image pickup system according to the first embodiment.

In the example in FIG. 11, an image processing system is constituted by three apparatuses of the image server 1101, the image processing apparatus 102, and the image display apparatus 103. However, the configuration of the present invention is not limited to this. For example, an image processing apparatus into which an image display apparatus is integrated may be used, or part of the function of the image processing apparatus 102 may be incorporated into the image server 1101. In contrast, the functions of the image server 1101 and the image processing apparatus 102 may be divided into small functions which are performed in multiple apparatuses.

Display of Combined Boundary Regions

A combined image which is obtained after the superimposing process, which is display data generated by the superimposing processor 306 included in the image processing apparatus according to the second embodiment, and which is displayed on the image display apparatus 103 will be described using FIG. 12.

Figure 12:
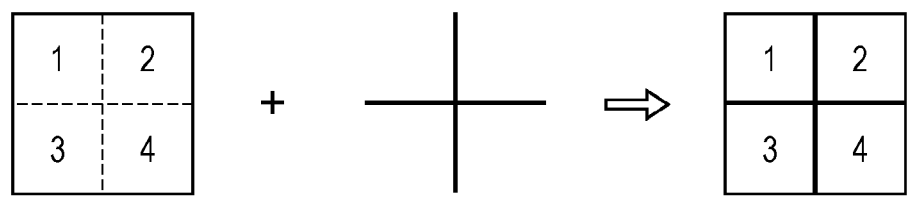
FIG. 12 is a diagram for describing a concept of combined-boundary-region data generation according to the second embodiment.

In FIG. 12, pieces of image data obtained by photographing divided portions are connected after being subjected to, for example, a coordinate transformation in any manner. Actually, a combined image is generated by aligning pieces of image data obtained after a transformation process along any border. By superimposing rendered data which corresponds to lines for connecting regions which are combined boundary regions on the connected combined-image data, combined-image data in which the combined boundary regions are distinguished from other regions is obtained. The color, the line width, and the line type of a line for the connecting region may be set. For example, the line type may be a single line or a multiplet line, may be a dotted line, a dashed line, or a dot-dash line, or may be a combination of these. Further, a line for the connecting region is switched in a time division manner, and blinking may be displayed to indicate whether or not a line is present.

Rendering Connecting Regions

Figure 13:
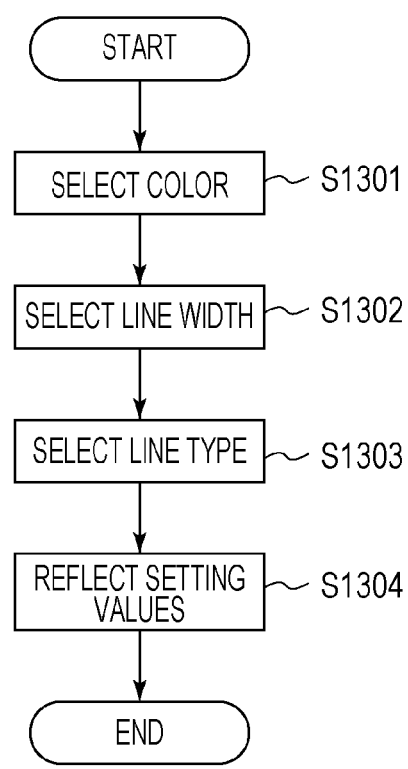
FIG. 13 is a flowchart of combined-boundary-region data generation according to the second embodiment.

FIG. 13 is a flowchart of the process in the second embodiment which corresponds to the process in step S607 in FIG. 6 according to the first embodiment and in which rendered data for combined boundary regions is generated.

In steps S1301, S1302, and S1303, the color, the line width, and the line type, respectively, are selected in accordance with the selection performed by the mode selector 307.

In step S1304, the setting values selected in steps S1301, S1302, and S1303 are reflected so as to generate rendered data for the lines which corresponds to combined boundary regions.

Superimposition of Combined-Boundary-Region Rendered Data

Figure 14:
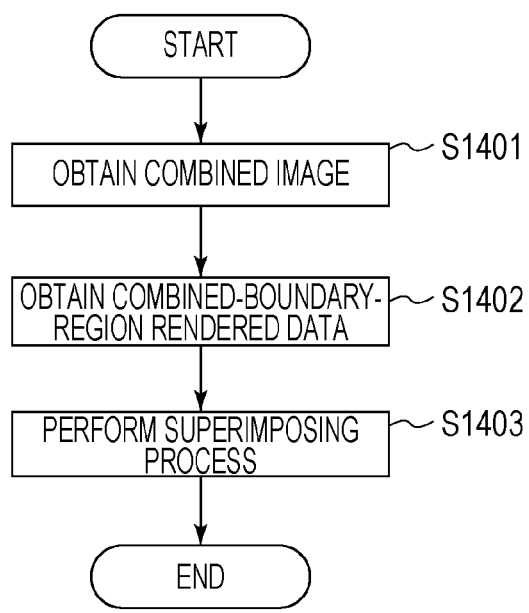
FIG. 14 is a flowchart of a superimposing process according to the second embodiment.

FIG. 14 is a flowchart of superimposition of combined-boundary-region rendered data on a combined image according to the second embodiment. This process flow corresponds to that in FIG. 8 according to the first embodiment.

In step S1401, the combined-image data obtained through a combining process performed by the combining processor 303 is obtained.

In step S1402, the combined-boundary-region rendered data generated by the combined-boundary-region rendering unit 305 is obtained. The process of generating combined-boundary-region rendered data is described with reference to FIG. 13.

In step S1403, the combined-image data obtained in step S1401 is superimposed on the combined-boundary-region rendered data obtained in step S1402.

Screen Layout

Figures 15A, 15B, 15C:
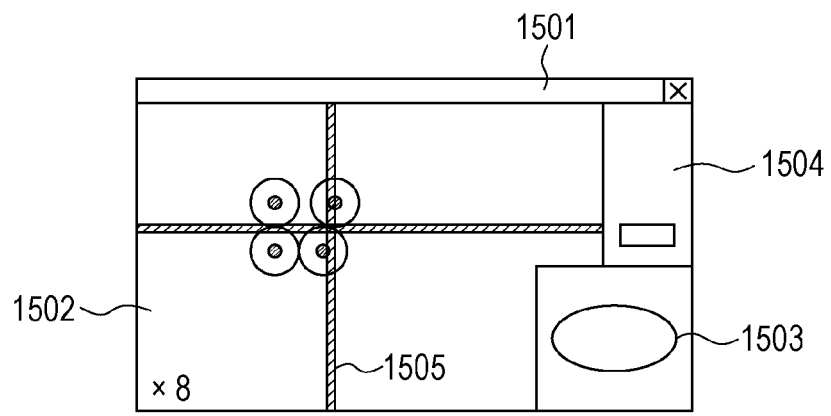
FIGS. 15A to 15C illustrate an exemplary display screen of an image display system according to the second embodiment.

FIG. 15A illustrates an exemplary screen layout used when image data generated by the image processing apparatus 102 is displayed on the image display apparatus 103, according to the second embodiment. The display area has a whole window 1501 in which a display area 1502 for image-pickup-target image data for detailed observation, a thumbnail image 1503 for the imaging target which is to be observed, and a display setting area 1504 are included. In the display area 1502 for image-pickup-target image data, in addition to image-pickup-target image data for detailed observation, a connecting region 1505 in the combined image is displayed as a line. FIG. 15B illustrates a display setting screen displayed as a dialog box when the setup button is selected and pressed, and whether or not the connecting regions which are combined boundary regions in the combined image are to be displayed as a line is selected. FIG. 15C illustrates a screen which is for various display settings for the lines for connecting regions and which is displayed as a dialog box when the lines for connecting regions which are combined boundary regions are to be displayed, and how the lines for connecting regions which are combined boundary regions in the combined image are to be displayed is set. Specifically, for example, the color, the line width, and the line type of a line can be selected and set. In the present embodiment, similarly to as in the first embodiment, it is assumed that a setup button is provided and a setting screen is opened by pressing the button. However, a UI in which various detailed settings illustrated in FIG. 15C can be displayed, selected, and changed may be provided directly on the display setting area 1504. Alternatively, a screen may be displayed in which a list for detailed settings including whether or not combined boundary regions are to be displayed is integrally provided.

In the present embodiment, it is possible to determine that a strange image caused by a position deviation between partial images and a focus deviation between partial images which inevitably occur appears. As a result, the case is prevented in which it is difficult to perform highly accurate diagnosis using combined boundary regions.

Third Embodiment

In a third embodiment, the mode for display of combined boundary regions in a combined image is changed by setting a boundary.

In the third embodiment, similarly to as in the first embodiment, on the precondition that a connecting region has a certain degree of width, a display magnification is set as a boundary. When the display magnification is high, combined boundary regions are displayed as in the first embodiment. When the display magnification becomes lower, combined boundary regions are displayed as a line as in the second embodiment.

For example, in the case of data in which the width of a connecting region is 64 pixels when a display magnification of 40 times is used, for detailed observation, the number of pixels used to display the connecting region is 64 in a display magnification (observation magnification in the field of optical microscope) of 40 times, and is 32 in a display magnification of 20 times. Accordingly, since a connecting region has a sufficient width, although change of the brightness is provided, it is desirable to display the image for the connecting region in terms of observation. However, in a screening process in pathological diagnosis, bird's-eye view observation is typically performed with a display magnification from 5 to 10 times. In the above-described case, the number of pixels used to display a connecting region is 8 to 16. This is not sufficient for morphological observation of tissue and cells. As the display magnification becomes lower, this tendency noticeably appears, and the visibility for a connecting region in which the brightness is changed significantly decreases. To complement this, in a magnification with which the width of a combined boundary region is not sufficient for observation, it is effective to switch to the method in which combined boundary regions are displayed as a line as described in the second embodiment. In general, it is desirable to change the mode in which combined boundary regions are displayed, by using, as a boundary, a magnification of 10 times with which a screening is performed.

In the present embodiment, the method for rendering combined boundary regions is switched in accordance with a display magnification serving as a boundary, whereby it is possible to display the connecting regions in a manner suitable for the purpose of observation for each of the display magnifications.

Other Embodiments

In the first to third embodiments, a connecting region of image data equivalent to that which can be visually observed by a user, such as a microscope image, is described. The present invention can be applied not only to a connecting region of an image based on such visual information, but also to a connecting region of display data obtained by an apparatus, such as a magnetic resonance imaging apparatus (MRI), an X-ray diagnostic apparatus, or diagnostic equipment using optical ultrasound, which visualizes information about a generally invisible object such as an internal structure of a human body by using various types of means or principle, achieving similar effects. In particular, unlike a visible image, this is image data generated from information based on intensity. Therefore, when change of contrast or brightness around a connecting region, image degradation caused by a correction process, or an error caused by the alignment for stitching occurs, it is very difficult to determine whether such an image change or a singular point occurs due to the connecting region, or indicates an abnormal state of the diagnosis site, compared with image information obtained using, for example, a microscope having color information. Therefore, it is very important that a connecting region is clearly presented to a user so that the user is given an indication that the image area around the connecting region may have low reliability.

An object of the present invention may be achieved as follows. That is, recording medium (or storage medium) in which software program codes which achieve some or all of the functions of the above-described embodiments are recorded is supplied to a system or an apparatus. Then, a computer (or a CPU or an MPU) in the system or the apparatus reads out and executes the program codes stored in the recording medium. In this case, the program codes themselves which are read out from the recording medium achieve the functions of the above-described embodiments, and the recording medium in which the program codes are recorded is included in the present invention.

A computer executes the program codes which are read out, whereby, for example, an operating system (OS) which is operating on the computer executes some or all of the actual processes on the basis of instructions of the program codes. The case where these processes achieve the functions of the above-described embodiments may be included in the present invention.

In addition, the program codes which are read out from the recording medium may be written into a function expansion card inserted into the computer or a memory included in a function expansion unit which is connected to the computer. Then, for example, a CPU included in the function expansion card or the function expansion unit executes some or all of the actual processes on the basis of instructions of the program codes, and such processes achieve the functions of the above-described embodiments. Such a case is also included in the present invention.

In the case where the present invention is applied to the above-described recording medium, program codes corresponding to the flowcharts described above are stored in the recording medium.

In the preferable image processing apparatus, the preferable image display system, the preferable image processing method, and the preferable image processing program according to the present invention, the case where it is difficult to perform highly accurate diagnosis using combined boundary regions in a combined image can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   an image data acquisition unit configured to acquire a plurality of pieces of divided image data obtained by capturing images of a plurality of regions into which a captured area for an imaging target is divided;
   a combined-image data generation unit configured to generate combined-image data on the basis of the plurality of divided image data; and a combined-boundary-region display data generation unit configured to generate display image data to be used for an observer to recognize combined boundary regions in the combined-image, wherein the combined-boundary-region display data generation unit changes at least one of a color and a brightness for all of the combined boundary regions included in a display area so that all of the combined boundary regions included in the display area can be visually recognized by an observer easier than before the change, wherein the image data acquisition unit acquires the plurality of pieces of divided image data obtained by capturing images in such a manner that regions in which the plurality of pieces of divided image data overlap are present, and wherein the combined-boundary-region display data generation unit uses image data for the regions in which the plurality of pieces of divided image data overlap, so as to generate image data to be used for an observer to recognize the combined boundary regions.

2. The image processing apparatus according to claim 1, wherein the image processing apparatus is applied to an image obtained by using a microscope.

3. The image processing apparatus according to claim 1, wherein the image processing apparatus is used in a virtual slide system.

4. The image processing apparatus according to claim 1, wherein the combined-image data generation unit performs superimposition or blending on the plurality of pieces of divided image data so as to generate combined-image data.

5. The image processing apparatus according to claim 1, wherein the combined-image data generation unit interpolates the regions in which the plurality of pieces of divided image data overlap, so as to generate combined-image data.

6. The image processing apparatus according to claim 1, wherein the combined-image data generation unit combines the plurality of pieces of divided image data so as to generate combined-image data to be displayed, and the combined-boundary-region display data generation unit generates a line for a region in which the plurality of pieces of divided image data are connected, as combined-boundary-region data.

7. The image processing apparatus according to claim 1, further comprising:

combined-boundary-region data switching unit configured to switch image data to be used for an observer to recognize the combined boundary regions generated by the combined-boundary-region display data generation unit.

8. The image processing apparatus according to claim 7, wherein the combined-boundary-region data switching unit performs switching of image data to be used for an observer to recognize the combined boundary regions generated by the combined-boundary-region display data generation unit, at a certain boundary.

9. The image processing apparatus according to claim 7, wherein the combined-boundary-region data switching unit performs switching of image data to be used for an observer to recognize the combined boundary regions generated by the combined-boundary-region display data generation unit, at a certain magnification.

10. A microscope image display system comprising:
an image processing apparatus; and
an image display apparatus,
wherein the image processing apparatus is the image processing apparatus according to claim 1, and wherein the image display apparatus displays combined-image data which is for the imaging target and which is transmitted from the image processing apparatus, and image data to be used for an observer to recognize the combined boundary regions.

11. The microscope image display system according to claim 10,
wherein the microscope image display system has a mechanism for displaying a combined boundary region when an instruction to display the combined boundary region is received.

12. An image processing method comprising:
acquiring a plurality of pieces of divided image data obtained by capturing images of a plurality of regions into which a captured area for an imaging target is divided;
generating combined-image data on the basis of the plurality of divided image data; and
generating display image data to be used for an observer to recognize combined boundary regions in the combined-image,
wherein, in the generating of display image data, at least one of a color and a brightness is changed for all of the combined boundary regions included in a display area so that all of the combined boundary regions included in the display area can be visually recognized by an observer easier than before the change,
wherein the acquiring of the plurality of pieces of divided image data obtained by capturing images is performed in such a manner that regions in which the plurality of pieces of divided image data overlap are present, and
wherein, in the generating of display image data, image data for the regions in which the plurality of pieces of divided image data overlap are used, so as to generate the image data to be used for the observer to recognize the combined boundary regions.

13. The image processing method according to claim 12, wherein the generating of combined-image data and the generating of display image data are simultaneously performed.

14. A non-transitory computer-readable storage medium storing a program for causing a computer to execute a process comprising:
acquiring a plurality of pieces of divided image data obtained by capturing images of a plurality of regions into which a captured area for an imaging target is divided;
generating combined-image data on the basis of the plurality of divided image data; and
generating display image data to be used for an observer to recognize combined boundary regions in the combined-image,
wherein, in the generating of display image data, at least one of a color and a brightness is changed for all of the combined boundary regions included in a display area so that all of the combined boundary regions included in the display area can be visually recognized by an observer easier than before the change,
wherein the acquiring of the plurality of pieces of divided image data obtained by capturing images is performed in such a manner that regions in which the plurality of pieces of divided image data overlap are present, and
wherein, in the generating of display image data, image data for the regions in which the plurality of pieces of divided image data overlap are used, so as to generate the image data to be used for the observer to recognize the combined boundary regions.

15. The image processing apparatus according to claim 1, wherein a gap between a value of a first pixel inside the combined boundary regions and a value of a second pixel outside the combined boundary regions is increased after the change conducted by the combined-boundary-region display generation unit as being compared to before the change, the second pixel being adjacent to the first pixel.

\* \* \* \* \*